United States Patent
Conforti

(10) Patent No.: US 9,542,548 B2
(45) Date of Patent: Jan. 10, 2017

(54) COMPUTER APPLICATION SECURITY

(71) Applicant: Carl J. Conforti, Berkley, MA (US)

(72) Inventor: Carl J. Conforti, Berkley, MA (US)

(73) Assignee: Carl J. Conforti, Berkley, MA (US)

( * ) Notice: Subject to any disclaimer, the term of this patent is extended or adjusted under 35 U.S.C. 154(b) by 150 days.

(21) Appl. No.: 14/157,250

(22) Filed: Jan. 16, 2014

(65) Prior Publication Data

US 2014/0201834 A1 Jul. 17, 2014

Related U.S. Application Data

(60) Provisional application No. 61/849,024, filed on Jan. 17, 2013.

(51) Int. Cl.
| | |
|---|---|
| *G06F 7/04* | (2006.01) |
| *G06F 12/00* | (2006.01) |
| *G06F 12/14* | (2006.01) |
| *G06F 13/00* | (2006.01) |
| *G06F 17/30* | (2006.01) |
| *G11C 7/00* | (2006.01) |
| *G06F 21/36* | (2013.01) |

(52) U.S. Cl.
CPC .................................. *G06F 21/36* (2013.01)

(58) Field of Classification Search
CPC ....................................................... G06F 21/36
USPC ......................................................... 726/19
See application file for complete search history.

(56) References Cited

U.S. PATENT DOCUMENTS

| | | | | |
|---|---|---|---|---|
| 8,159,327 | B2* | 4/2012 | Faith | G06Q 20/40 340/5.27 |
| 8,755,066 | B2* | 6/2014 | Shudo | H04N 1/00973 358/1.1 |
| 2006/0242607 | A1* | 10/2006 | Hudson | G06F 3/04817 715/863 |
| 2006/0257128 | A1* | 11/2006 | Ishito | G03B 17/00 396/55 |
| 2007/0234410 | A1* | 10/2007 | Geller | G06F 21/31 726/8 |
| 2009/0227232 | A1* | 9/2009 | Matas | H04M 1/665 455/411 |
| 2013/0321277 | A1* | 12/2013 | Ha | G06F 3/02 345/168 |

(Continued)

OTHER PUBLICATIONS

Mac Developer Library. (Jan. 30, 2008). Technical Note TN2095, Authorization for Everyone. Retrieved from https://developer.apple.com/library/mac/technotes/tn2095/_index.html.

(Continued)

*Primary Examiner* — Dant Shaifer Harriman
(74) *Attorney, Agent, or Firm* — Hunter Clark PLLC

(57) ABSTRACT

A method of providing restricted access to computer application information via a computing device includes: displaying a limited-access icon on a display of the computing device, the limited-access icon including a function indicator and code-entry segments that can be selected by a user of the computing device, each of the code-entry segments including a visual indicator; receiving a selection sequence of user selections of selected ones of the code-entry segments; and performing a limited-access function corresponding to the function indicator in response to the selection sequence corresponding to an authorized sequence.

14 Claims, 6 Drawing Sheets

(56) References Cited

U.S. PATENT DOCUMENTS

2014/0181957 A1* 6/2014 Nguyen ................ G06F 21/36
726/19

OTHER PUBLICATIONS

Mac Developer Library. (Aug. 12, 2009). Open Directory Programming Guide. Retrieved from https://developer.apple.com/library/mac/documentation/Networking/Conceptual/Open_Directory/OpenDir.pdf.
Mac Developer Library. (Oct. 14, 2009). Security Interface Framework Reference. Retrieved from https://developer.apple.com/library/mac/documentation/Security/Reference/SecurityObjectiveC/_index.html.
Mac Developer Library. (May 12, 2011). Security Transforms Reference. Retrieved from https://developer.apple.com/library/mac/documentation/Security/Reference/SecurityTransformsRef/.
Mac Developer Library. (Oct. 19, 2011). Authorization Services Programming Guide. Retrieved from https://developer.apple.com/library/mac/documentation/Security/Conceptual/authorization_concepts/authorizationconcepts.pdf.
Mac Developer Library. (Oct. 19, 2011). Authorization Services C Reference. Retrieved from https://developer.apple.com/library/mac/documentation/Security/Reference/authorization_ref/Reference/reference.html.
Mac Developer Library. (Jun. 11, 2012). Security Transforms Programming Guide. Retrieved from https://developer.apple.com/library/mac/documentation/Security/Conceptual/SecTransformPG/SecTransformPG.pdf.
iOS Developer Library. Developer Library. (Jun. 11, 2012). CFNetwork Programming Guide. Retrieved from https://developer.apple.com/library/ios/documentation/Networking/Conceptual/CFNetwork/Introduction/Introduction.html.
Mac Developer Library. (Jul. 17, 2012). Certificate, Key, and Trust Services Reference. Retrieved from http://nathanmock.com/files/com.apple.adc.documentation.AppleiOS6.0.iOSLibrary.docset/Contents/Resources/Documents/#documentation/Security/Reference/certifkeytrustservices/Reference/reference.html.
Mac Developer Library. (Jul. 17, 2012). "Creating Your Team's Signing Certificates" in Developing for the App Store. Retrieved from http://nathanmock.com/files/com.apple.adc.documentation.AppleiOS6.0.iOSLibrary.docset/Contents/Resources/Documents/#documentation/General/Conceptual/ApplicationDevelopmentOverview/CreateYourDevelopmentTeam/CreateYourDevelopmentTeam.html.
Mac Developer Library. (Jul. 23, 2012). Code Signing Guide. Retrieved from https://developer.apple.com/library/mac/documentation/Security/Conceptual/CodeSigningGuide/CodeSigningGuide.pdf.
Mac Developer Library. (Dec. 13, 2012). Cryptographic Services Guide. Retrieved from https://developer.apple.com/library/mac/documentation/Security/Conceptual/cryptoservices/cryptoservices.pdf.
Mac Developer Library. (Jan. 28, 2013). Authorization, and Permissions Guide. Retrieved from https://developer.apple.com/library/mac/documentation/Security/Conceptual/AuthenticationAndAuthorizationGuide/AuthenticationAndAuthorizationGuide.pdf.
Mac Developer Library. (Jan. 28, 2013). Certificate, Key, and Trust Services Programming Guide. Retrieved from https://developer.apple.com/library/mac/documentation/Security/Conceptual/CertKeyTrustProgGuide/CertKeyTrustProgGuide.pdf.
Das, S. (Aug. 3, 2013). The Epic Security App (App Lock ) 2014 !!! [Video file]. Retrieved from: https://www.youtube.com/watch?v=wxfgOojOXfs.
iOS Developer Library. (Oct. 22, 2013). URL Loading System Programming Guide. Retrieved from https://developer.apple.com/library/ios/documentation/Cocoa/Conceptual/URLLoadingSystem/URLLoadingSystem.pdf.
Mac Developer Library. (Oct. 22, 2013). Daemons and Services Programming Guide. Retrieved from https://developer.apple.com/library/mac/documentation/MacOSX/Conceptual/BPSystemStartup/BPSystemStartup.pdf.
iOS Developer Library. (Oct. 23, 2013). Advanced App Tricks. In iOS App Programming Guide. Retrieved from https://developer.apple.com/library/ios/documentation/iPhone/Conceptual/iPhoneOSProgrammingGuide/AdvancedAppTricks/AdvancedAppTricks.html.
Mac Developer Library. (Feb. 11, 2014). Keychain Services Programming Guide. Retrieved from https://developer.apple.com/library/mac/documentation/Security/Conceptual/keychainServConcepts/01introduction/introduction.html.
Mac Developer Library. (Feb. 11, 2014). Keychain Services Reference. Retrieved from https://developer.apple.com/library/mac/documentation/Security/Reference/keychainservices/Reference/reference.html.
iOS Developer Library. (Feb. 11, 2014). Secure Transport Reference. Retrieved from https://developer.apple.com/library/ios/documentation/Security/Reference/secureTransportRef/Reference/reference.html.
iOS Developer Library. (Feb. 11, 2014). Designing Secure Helpers and Daemons. In Secure Coding Guide. Retrieved from https://developer.apple.com/library/ios/documentation/Security/Conceptual/SecureCodingGuide/SecureCodingGuide.pdf.
Training for Android Developers. (Oct. 21, 2013). Security Tips. Retrieved from https://web.archive.org/web/20131021215644/http://developer.android.com/training/articles/security-tips.html.
Android Design. (Oct. 31, 2013). Application Structure. Retrieved from https://web.archive.org/web/20131031070853/http://developer.android.com/design/patterns/app-structure.html.

* cited by examiner

COMPUTER APPLICATION SECURITY

CROSS-REFERENCE TO RELATED APPLICATIONS

This application claims the benefit of U.S. Provisional Application No. 61/849,024, filed Jan. 17, 2013, entitled "Security Application Icon."

BACKGROUND

Consumer electronic devices are ubiquitous in today's society. The advances in and proliferation of computer technology have resulted in consumers have computing power at their disposal in a variety of forms including desktop computers, laptop computers, smartphones, tablets, etc. In recent years, there has been a significant proliferation of computer applications, or "apps," that can be run on the computing devices for all manner of reasons, e.g., gaming, banking, shopping, reserving airline tickets, playing music, watching videos, communicating with others, accessing emails and other personal information, etc. Often, these apps use information and/or perform functions that the owner of the computing device would prefer to be kept private while being easily accessible. For example, shopping applications could be used to make purchases that are charged to the owner's credit card account. To inhibit access to applications, many computing devices provide for password protection, requiring the entry of a password in order to access the computing device or a particular application to be run on the computing device. Such password requirements may take the form of a login screen requiring the password before access to any features of the computing device are provided, or the display of a password screen prompting the entry of a password in response to selection of an application. It is common to use icons to access a program or a security log-in process with selection (input) of an icon causing a change in a screen graphical image (output). The new image prompts the user for a security code (input) to access a new screen graphical image (output) that may be a primary access to the program.

SUMMARY

An example of a method of providing restricted access to computer application information via a computing device includes: displaying a limited-access icon on a display of the computing device, the limited-access icon including a function indicator and code-entry segments that can be selected by a user of the computing device, each of the code-entry segments including a visual indicator; receiving a selection sequence of user selections of selected ones of the code-entry segments; and performing a limited-access function corresponding to the function indicator in response to the selection sequence corresponding to an authorized sequence.

Implementations of such a method may include one or more of the following features. The code-entry segments are disposed adjacent to and outside a perimeter of the function indicator. At least one of the code-entry segments overlays the function indicator. The function indicator is an indication of the computer application and performing the limited-access function includes starting the computer application. There is more than one authorized selection sequence and more than one limited-access function corresponding to the function indicator, and performing the limited-access function includes performing the limited-access function that corresponds to the selection sequence. The function indicator is a portion of a page of the computer application and performing the limited-access function includes displaying information indicated by the function indicator or initiating an operation, within the computer application, indicated by the function indicator. The method further includes, in response to selecting the function indicator, associating the code-entry segments with the function indicator and displaying the code-entry segments with the function indicator as the limited-access icon. At least one of the visual indicators changes in response to the computing device receiving a selection of at least one of the code-entry segments by the user.

An example of a computing device includes: display means for displaying a limited-access icon, the limited-access icon including a function indicator and code-entry segments that can be selected by a user of the computing device, each of the code-entry segments including a visual indicator; selection means for receiving a selection sequence of user selections of selected ones of the code-entry segments; and access means for performing a limited-access function corresponding to the function indicator in response to the selection sequence corresponding to an authorized sequence.

Implementations of such a computing device may include one or more of the following features. The display means are for displaying the code-entry segments outside a perimeter of the function indicator. The display means are for displaying the code-entry segments such that at least one of the code-entry segments overlays the function indicator. The function indicator is an indication of the computer application and the limited-access function includes starting the computer application. There is more than one authorized selection sequence and more than one limited-access function corresponding to the function indicator, and the access means are for performing the limited-access function that corresponds to the selection sequence.

An example of a computer program product stored on a non-transitory, processor-readable medium includes instructions for causing a processor to: cause a display to display a limited-access icon, the limited-access icon including a function indicator and code-entry segments that can be selected, each of the code-entry segments including a visual indicator; receive a selection sequence of selections of selected ones of the code-entry segments; and perform a limited-access function corresponding to the function indicator in response to the selection sequence corresponding to an authorized sequence.

Implementations of such a computer program product may include one or more of the following features. The instructions are configured to cause the processor to cause the display to display the code-entry segments adjacent to and outside a perimeter of the function indicator. The instructions are configured to cause the processor to cause the display to display least one of the code-entry segments overlaying the function indicator. The function indicator is an indication of the computer application and the instructions configured to cause the processor to perform the limited-access function are configured to cause the processor to start the computer application. There is more than one authorized selection sequence and more than one limited-access function corresponding to the function indicator, and the instructions configured to cause the processor to perform the limited-access function are configured to cause the processor to perform the limited-access function that corresponds to the selection sequence. The function indicator is a portion of a page of the computer application and the instructions configured to cause the processor to perform the limited-access function are configured to cause the processor to display information indicated by the function indicator or initiate an operation, within the computer application, indicated by the function indicator. The instructions further include instructions configured to cause the processor to, in response to receiving an indication of a selection of the function indicator, associate the code-entry segments with the function indicator and cause the display to display the code-entry segments with the function indicator as the limited-access icon.

Items and/or techniques described herein may provide one or more of the following capabilities, as well as other capabilities not mentioned. An application access code may be entered without first attempting to launch the application. An application access code may be prompted and entered without displaying a separate access code screen. Cloud computing may benefit from the use of more efficient security access for computing devices and support coding that can be easily accessed through a graphical image icon or application. Reducing or eliminating multiple steps of selecting an icon, entering a password, and producing a response to the password, and corresponding computing required to implement or facilitate the steps, may improve speed and reduce risk of error in accessing secured applications. Access to information within a computer application may be conveniently restricted. Functions within a computer application may have restricted access. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

DETAILED DESCRIPTION

Techniques are provided for efficiently accessing secure information of a computer application. For example, a computer application icon is integrated with a code entry display for use in providing an access code. The application icon or visual graphic image may be a launch icon or image, selection of which using an acceptable access code will launch or allow access to the application. Alternatively, the icon may form a part of an access code prompting display that is shown to a user in response to attempting to launch the application, e.g., in response to selecting an application launch icon. Alternatively still, the icon may be a portion of a screen within an application to provide limited-access to a portion of information within the application. A computer application, as used herein, refers to an application run on an electronic device capable of processing electronic data, i.e., computing. Thus, a computer application may alternatively be referred to as an electronic data application.

Figure 1:
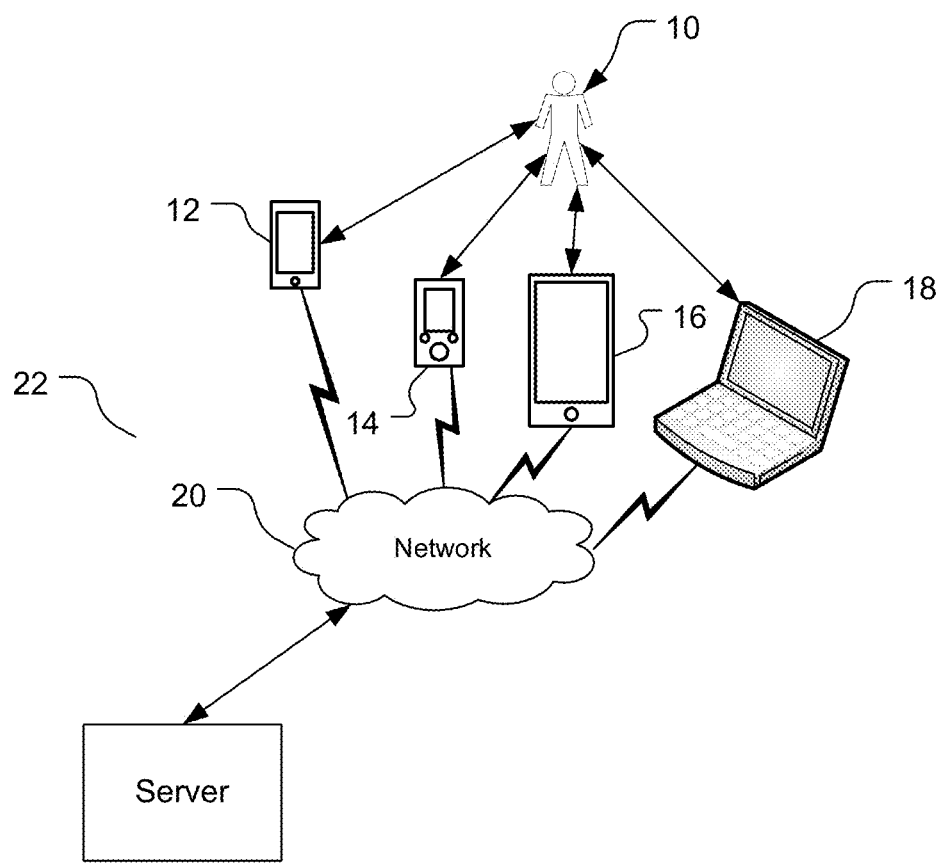
FIG. 1 is a simplified, partially-block, diagram of a user interacting with computing devices in communication with a server.

Referring to FIG. 1, a user 10 can interact with a variety of computing devices 12, here mobile electronic communication devices (or simply "mobile devices"), and in particular as examples a smart phone $12_1$, a personal digital assistant (PDA) $12_2$, a tablet computer $12_3$, or a laptop computer $12_4$. Other computing devices, including devices not typically considered to be mobile devices (e.g., desktop computers) could be used. Also, similar devices can also be used when computing and access to a secured application are combined. Each of the devices $12_1$-$12_4$ is configured to receive input from the user 10, e.g., through a keyboard, a virtual keyboard, a touch-screen display, etc., and provide information to the user 10, e.g., through the display, through a speaker, etc. Each of these devices 12 may also be configured to communicate with a network 20 to send information to, and receive information from, a server 22, although this is not required and the server 22 may not be used. While only one server 22 is shown, this server could include multiple servers that can be associated with different services and may be completely separate from each other, both physically and logically (such that data in each are not accessible by the others without authorization). The discussion below discusses a generic example of one of the mobile devices 12, with the devices 12 having similar configurations (e.g., having similar components to those shown and discussed, although any particular device may have one or more other components that may be different from device to device).

Figure 2:
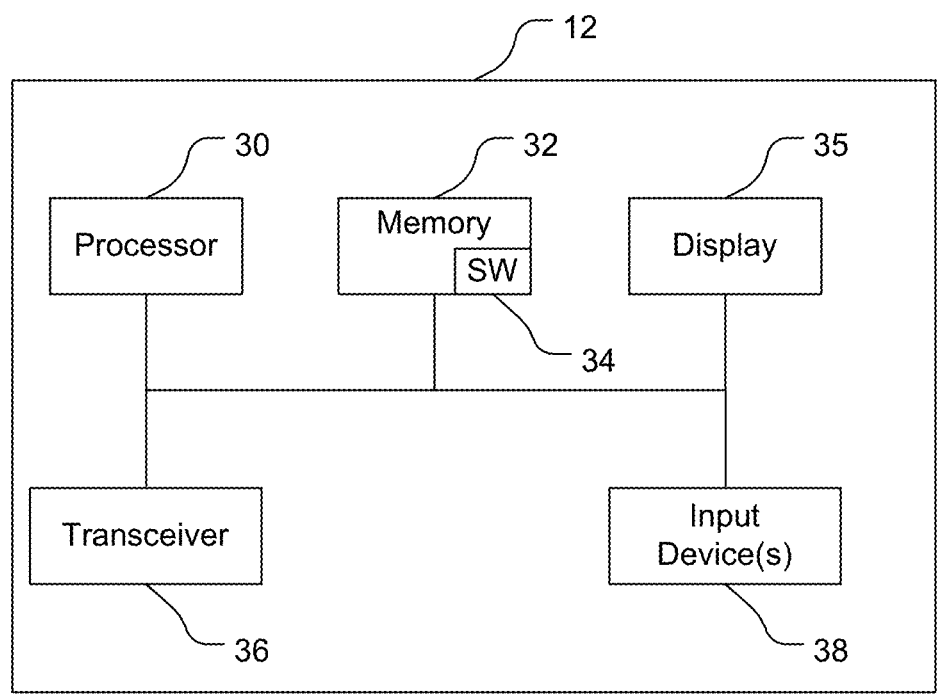
FIG. 2 is a block diagram of one of the computing devices shown in FIG. 1.

Referring also to FIG. 2, an example of one of the computing devices 12 comprises a computer system including a processor 30, memory 32 including software 34, a display 35, a transceiver 36, and one or more input devices 38. The input device(s) 38 may include a keyboard, a microphone, the display 35 (e.g., a touch-sensitive display), etc. The transceiver 36 is a wireless and/or wired communication module that can communicate with the network 14 (e.g., through a base transceiver station, also known as a cell tower) and a wide area network (WAN) and/or a personal area network (PAN) and/or a WiFi node and/or another entity. The transceiver 36 includes one or more antennas as appropriate, e.g., to communicate with the base transceiver station. Other example mobile devices may have different configurations, e.g., without the transceiver 36. The transceiver 36 is configured to communicate bi-directionally with the network 14 wirelessly and/or through hard-wire connections. The transceiver 36 is optional, although its presence is preferred. The display 35 is configured to provide visual indications of information for the user 10, and may be configured to receive user input, e.g., including a touch-sensitive screen. The processor 30 is preferably an intelligent hardware device, e.g., a central processing unit (CPU) such as those made by ARM®, Intel® Corporation, or AMD®, a microcontroller, an application specific integrated circuit (ASIC), etc. The processor 30 could comprise multiple separate physical entities that can be distributed in the mobile device 12. The memory 32 is a processor-readable storage medium and includes random access memory (RAM) and read-only memory (ROM). The memory 32 stores the software 34 which is processor-readable, processor-executable software code containing instructions that are configured to, when executed, cause the processor 30 to perform various functions described herein (although the description may refer only to the processor 30 performing the functions). Alternatively, the software 34 may not be directly executable by the processor 30 but configured to cause the processor 30, e.g., when compiled and executed, to perform the functions.

The software 34 includes limited-access software that may be stored in the memory 32 during manufacture of the mobile device 12 or after manufacture, e.g., by being downloaded and stored in the memory 32. Limited-access software may be included in software downloaded as part of an app and installed on the mobile device 12, may be separate from downloaded app software, or both. That is, the software 34 may include limited-access software that is not part of downloaded app software and also limited-access software that is part of downloaded app software.

Figure 3:
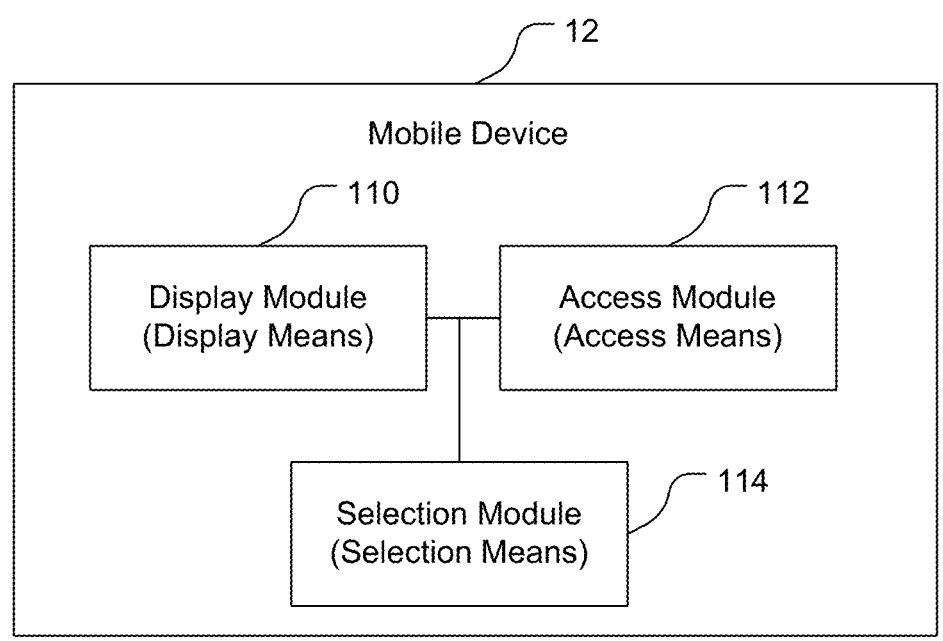
FIG. 3 is a block functional diagram of portions of the computing device shown in FIG. 2.

Referring to FIG. 3 the computing device 12 includes a display module (display means) 110, an access module (access means) 112, and a selection module (selection means) 114. The display module 110, the access module 112, and the selection module 114 are functional modules implemented by the processor 30 and the limited-access software of the software 34 stored in the memory 32, in conjunction with the display 35 and/or the input device(s) 38. Thus, reference to any of the display module 110, the access module 112, or the selection module performing or being configured to perform a function is shorthand for the processor 30 performing or being configured to perform the function in accordance with the software 34 (and/or firmware, and/or hardware of the processor 30) in conjunction with the display 35 and/or the input device(s) 38.

Figure 4:
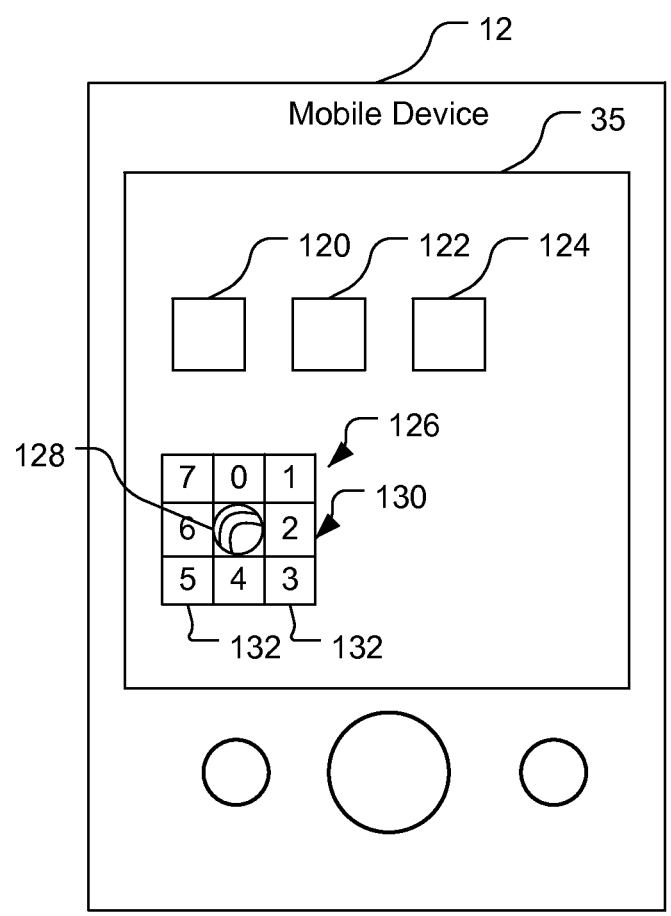
FIG. 4 is a sample, simplified screen shot of a display of the computing device shown in FIG. 2 showing an example of a limited-access icon.
Figure 5A:
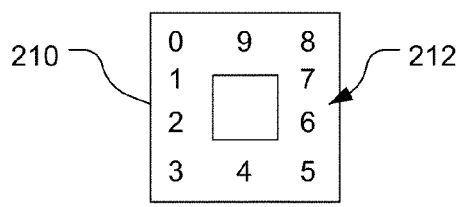
FIGS. 5A-5G are simplified diagrams of example limited-access (security-access) icons.
Figure 5B:
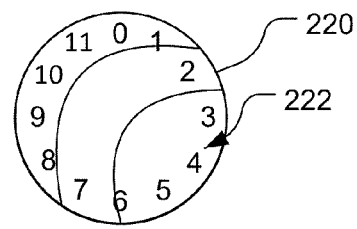
Figure 5C:
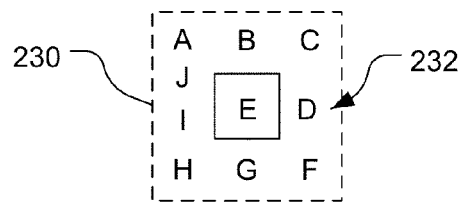
Figure 5D:
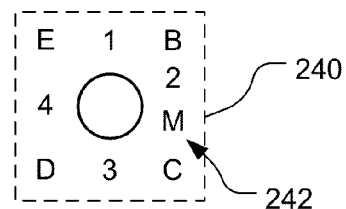
Figure 5E:
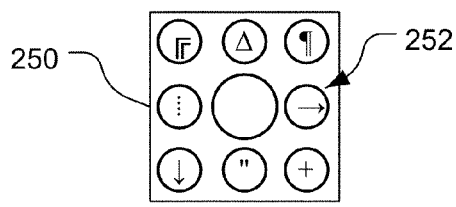
Figure 5F:
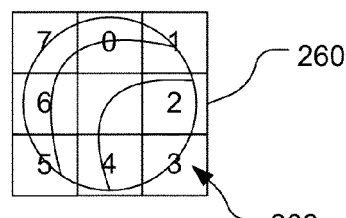
Figure 5G:
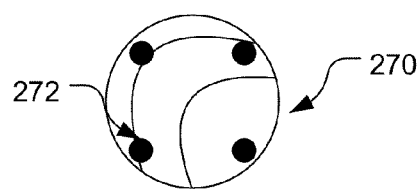

Referring also to FIG. 4, the display module 110 is configured to control the display 35. The display module 110 is configured to cause the display 35 to show icons 120, 122, 124, 126 for actuating various applications. The applications may be executed locally on the device 12, or in conjunction with the server 22 via the network 20. The display module 110 is configured to display limited-access icons with code-entry indications. The display module 110 is configured to display icons as limited-access icons according to indications in the software 34 that the icons are limited-access icons (and to display icons as regular, not limited-access icons, in the absence of such indications). The limited-access indications may be provided with software for the app itself, or may be provided based on input from the user 10 through the input device(s) 38. The user 10 may interact with the mobile device 12 via the selection module 114 to select an existing icon to become, or cease being, a limited-access icon. For example, the user 10 may actuate the selection module 114 to cause the display 35 to show a list of available app icons and their access status (limited-access or not). The user 10 may change the access status as desired, e.g., by tapping an access indication to toggle the access status.

The icon 126 is a limited-access icon (i.e., a security icon, an access-controlled icon, an authorization-required icon) configured to require entry of an access code in order to trigger the application. Alternatively, the limited-access icon 126 may be configured to require entry of the access code in order to provide access to information, e.g., information within an application. Thus, the limited-access icon may be for a portion of an application, a sub-application, such as for providing access to checking account information within a banking application.

As shown, the icon 126 includes a function indicator 128 and a code-entry portion 130. In this example, the function indicator 128 is an indication of a computer app (e.g., an icon associated with the computer application; here a fictitious icon for a fictitious app). The function indicator 128 and the code-entry portion 130 are displayed concurrently, as part of a single image. Further, in this example, the code-entry portion 130 includes code-entry segments 132 that indicate numbers, that are all the same size, and that surround (are disposed about a perimeter of) the app-indicating portion 128.

Numerous other examples of icons are possible, e.g., with the code-entry segments 132 including visual indicators such as text, letters, symbols, colors, characters, combinations of these (e.g., number and symbol in a single code-entry segment 132, at least one segment 132 indicating a symbol and at least one portion indicating a letter, etc.), or other indications. Referring to FIGS. 5A-5G, further example limited-access icons 210, 220, 230, 240, 250, 260, 270 are shown. These example icons are not exhaustive of the possibilities for limited-access icons, but are provided to give some examples of the limitless possibilities for limited-access icons. In each of the icons 210, 230, 240, 250, a central portion of the icon includes a function indicator, here an app indicator in an app-indicating portion of the respective icon. The function indicator may be of any shape (e.g., a square or a circle, as shown). As shown by the icons 210, 240, 250, the code-entry segments may lie outside a perimeter of the app-indicating portion. As shown by the icons 220, 260, 270, code-entry segments may overlay the app-indicating portion. As shown by the icon 230, one or more of the code-entry segments may overlay the app-indicating portion while one or more of the code-entry segments lies outside of an area of the app-indicating portion (e.g., preferably adjacent to, and even abutting, the app-indicating portion). As further shown by the icons 220, 260, 270, an app-indicating portion may be a background and extend over all, or substantially all, of the respective icon. As shown by the icons 230, 240, limited-access icons may not have a defined border (e.g., if the background of the icon is similar to (e.g., similar color as) a surrounding of the icon on the display). Code-entry segments 212, 222, 232, 242, 252, 262, 272 of the icons 210, 220, 230, 240, 250, 260, 270 show just some code-entry portion possibilities. The segments 212, 222, 232, 242, 252 show that different quantities of code-entry segments may be used, that any variety and combination of symbols may be used (e.g., numbers, letters, mathematical symbols, other symbols, etc.). The code-entry symbols may not have a meaning, but may be a reference for a location. Thus, the icon 270 has four dots as code-entry segments to indicate areas to be selected in an order corresponding to a code. The code-entry segments need not be evenly distributed (see the icon 240). Further still, the visual indications provided by the segments 132, 142 could change, e.g., after each actuation/selection of one or more of the segments 132, 142, after a number of actuations/selections of one or more of the segments 132, 142, after completion of a sequence of actuations/selections of the segments 132, 142 (either authorized or unauthorized), between consecutive displays of the icon 126, 146 (e.g., each time the icon 126, 146 is displayed anew, e.g., after a power-down of the computing device 12 or after a screen power-down), etc.

Figure 6:
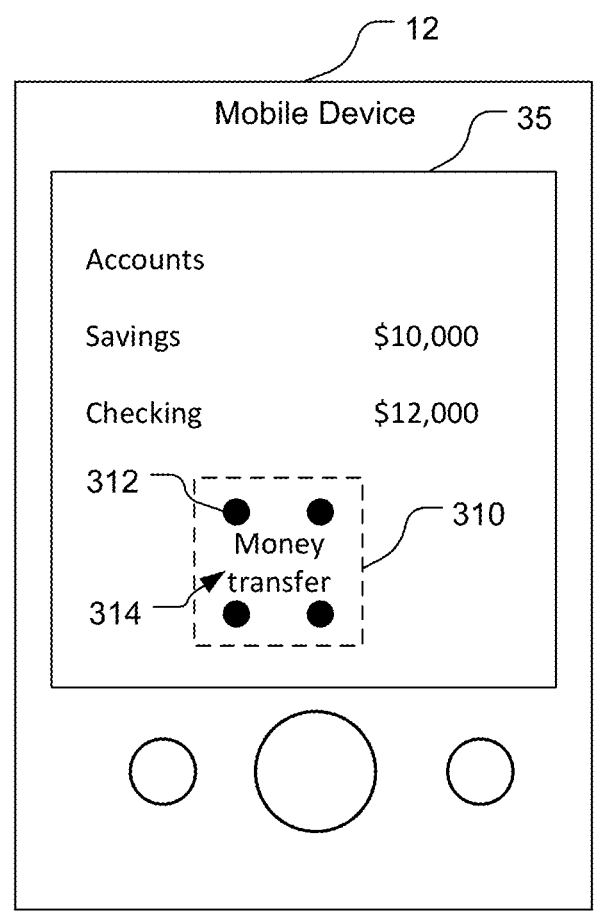
FIG. 6 is another sample, simplified screen shot of a display of the computing device shown in FIG. 2 showing another example of a limited-access icon.

Referring also to FIG. 6, with further reference to FIGS. 1 and 3, a limited-access icon 310 may have code-entry segments 312 and a function indicator 314 that is an information-indicating portion of a page within a computer application. In this example, a banking application is in use and displaying account information on the display 35. A link for a "money transfer" option is provided, with the text "money transfer" being the function indicator 314 of the limited-access icon 310 (e.g., having been selected as a limited-access icon by the user 10 or predefined as a limited-access icon by the banking application). In the example shown, the icon 310 has four dots as the code-entry segments 312 to prompt the user 10 to enter a pattern of dot selections to enter an access code. The function indicator 314 may be indicative of information only, e.g., an account number, such that the corresponding function is to display the indicated information. The sequence of selection of the code-entry segments 312 are selected in one or more authorized preset orders to access a program, or portion of the program. A code-entry segment 312 may coincide with the function indicator 314 such that the user 10 enters a sequence of selections of the code-entry segments 312 and what appears to be the function indicator 314. The user 10 may select visual indicators provided by the code-entry segments 312 such that the sequence of code-entry segments 312 selected may vary even with selection of the same sequence of visual indicators (e.g., if the visual indicators provided by the code-entry segments 312 change, e.g., after a selection of one or more of the code-entry segments, after a selection sequence of the code-entry segments 312, etc.). Entry of an authorized selection sequence will provide access to a program or one or more other functions as desired.

The display module 110 may implement one or more of various techniques to facilitate entry of access codes. For example, instead of displaying a limited-access icon with both an app-indicating portion and code-entry segments, the limited-access icon could look like other icons, e.g., with only an app-indicating portion, but the display module 110 could respond to actuation of the limited-access icon (as indicated by the selection module 114) by displaying an icon similar to the icon 126, possibly on the display 35 all by itself. The actuation of the limited-access icon may be done in a variety of manners, e.g., by tapping the icon on a touch-sensitive display, by hovering a cursor over the icon, by pressing on the icon on a touch-sensitive display for longer than a threshold amount of time, etc. The display module 110 may enlarge a limited-access icon in response to selection of the limited-access icon in order to facilitate entry of an access code. Entry of an authorized selection sequence, predetermined by the software 34 (e.g., as configured by the user 10 setting one or more authorized access codes), using the limited-access icon 126 will provide access to one or more functions (e.g., starting an app, providing information, etc.).

The selection module 114 is configured to receive input from the user 10 as to selection of the code-entry segments of icons. The user 10 may select code-entry segments in any data-input technique presently known or developed in the future. For example, the user 10 may tap or swipe the display 35, may use a keyboard to enter symbols corresponding to code-entry segments (e.g., numbers or letters, etc.), or may use a mouse to move a cursor over a code-entry portion and select the code-entry portion by clicking the mouse. The selection module 114 may also receive one or more authorized sequences set by the user 10 for future use in granting or denying access to one or more functions. The user 10 may input information and one or more authorized sequences, e.g., of physical patterns, sequences of visual indicators (e.g., characters, symbols, alphanumeric characters, or other graphical representations) to an input device such as a terminal, including a point-of-sale terminal or retail register, to access a function (e.g., to access financial information, account information, electronic payment functionality, etc.). Further, the selection module 114 may receive other forms of input such as finger print scans or iris scans as secondary authorization information in addition to the access code(s).

Referring again to FIG. 3-4, using the icon 126 as an example, the access module 112 is configured to analyze a code entered by the user 10 (FIG. 1) via the code-entry portion 130 as detected and indicated by the selection module 114. The selection module 114 is configured to receive a sequence of selections of the segments 132 as selected by the user 10 and provide one or more corresponding indications (e.g., of the individual selections or of the sequence of selections) to the access module 112. The access module 112 is configured to respond to the one or more indications by checking to see if an acceptable access code was entered. An acceptable code may be a sequence of actuations of the segments 132. The actuations may be of single segments 132 at a time, or may be simultaneous actuations of more than one of the segments 132, or may include one or more single-segment actuations and one or more multiple-segment actuations. An acceptable sequence may also include one or more actuations of the app-indicating portion 128 (i.e., the app-indicating portion 128 may comprise one of the code-entry segments 132). The access module 112 may analyze any sequence starting from an actuation of any of the code-entry segments 132 (e.g., touching of the corresponding portion of the display 35) or may require the actuation of the app-indicating portion 128 to initiate analysis of a sequence of actuations of the code-entry segments 132.

The access module 112 is configured to respond to entry of an acceptable access code by providing access to corresponding information. For example, the access module 112 may trigger the starting of a corresponding app in response to receipt of a valid code, or may provide access within an app to information corresponding to the limited-access icon (e.g., to money transfers in response to a valid code for the icon 310 shown in FIG. 6). There may be multiple acceptable codes for a single limited-access icon and the access module 112 may be configured to provide different access (e.g., different levels of access) in response to entry of different ones of the multiple acceptable codes. For example, the access module 112 may trigger the actuation of an app in a read-only format in response to entry of a first code and to trigger actuation of the app in a full-access mode (allowing editing of data) in response to entry of a second code. As another example, the access module 112 may provide access to different information (e.g., with different levels of sensitivity) based on the code entered. As still another example, the access module 112 may provide access to different functions, or variations of functions, based on the code entered (e.g., in the example of FIG. 6 money transfers, providing access to transfer different maximum amounts of money based on the code entered). The access module 112 may require a multi-layer sequential code (e.g., multiple codes using one or more code-entry segments displays) or a single access code using a single code-entry portion display, for access to a desired function.

Figure 7:
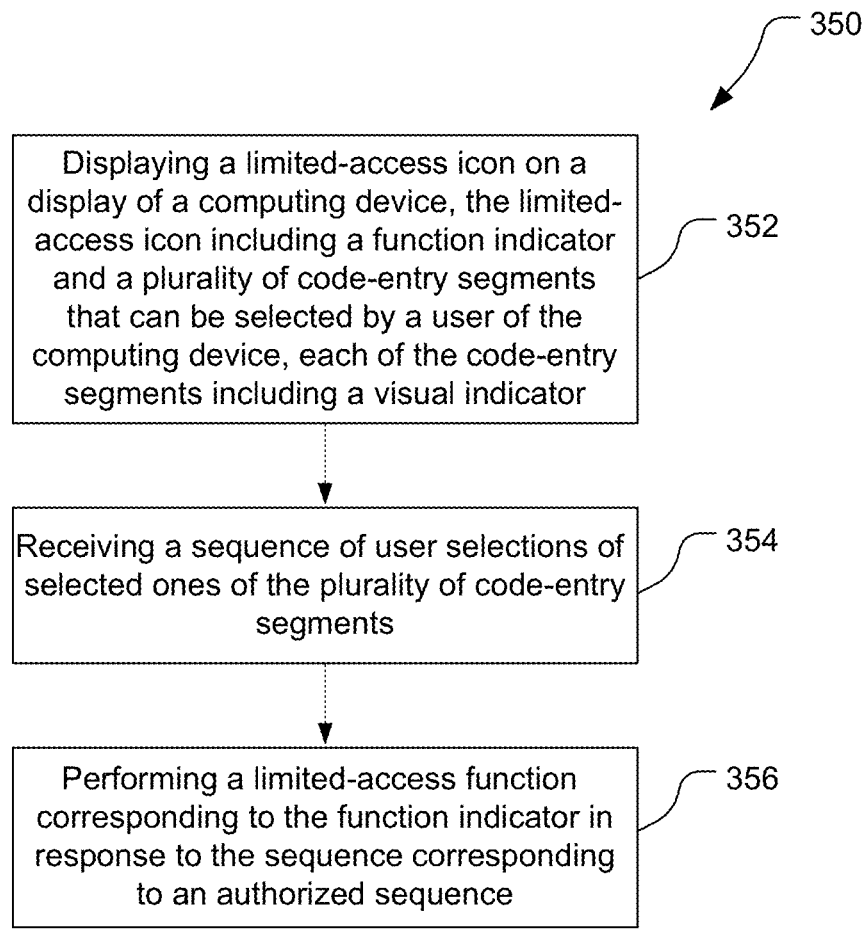
FIG. 7 is a block flow diagram of a process of providing restricted access to a computer application via a computing device.

Referring to FIG. 7, with further reference to FIGS. 1-5, a process 350 of providing restricted access to computer application information via a computing device includes the stages shown. The process 350 is, however, an example only and not limiting. The process 350 can be altered, e.g., by having stages added, removed, rearranged, combined, and/or performed concurrently. Further, the process 350 is discussed with respect to the computing device 12 and the icon 126 as an example, but the process 350 could be used with other computing devices, e.g., the devices 14, 16, 18, and/or other limited-access icons, e.g., the icons 210, 220, 230, 240, 250, 260, 270 shown in FIGS. 5A-5G, or other icons.

At stage 352, the process 350 includes displaying a limited-access icon on a display of the computing device, the limited-access icon including a function indicator and a plurality of code-entry segments that can be selected by a user of the computing device, each of the code-entry segments including a visual indicator. The display module (display means) 110 causes the display 35 to display the limited-access icon 126. The icon includes a plurality of the code-entry segments 132 that can be selected by the user 10 of the computing device 12. The code-entry segments 132 may provide visual indicators, e.g., of numerical characters and/or other visual representations. With the limited-access icon 126, the code-entry segments 132 are disposed adjacent to and outside a perimeter of the function indicator 128. With other icons, one or more of the code-entry segments may overlay, at least partially, the function indicator 128. Further still, the function indicator may be a portion of text or other portion of a page displayed to the user by the computer application (e.g., a link to another page).

At stage 354, the process 350 includes receiving a selection sequence of user selections of selected ones of the plurality of code-entry segments. The access module (access means) 112 receives a selection sequence of user selections of selected ones of the plurality of code-entry segments 132. The user 10 selects the segments 132 in a desired sequence and the access module 112 receives indications of the selections for comparison with one or more acceptable (authorized) sequences.

At stage 356, the process 350 includes performing a limited-access function corresponding to the function indicator in response to the selection sequence corresponding to an authorized sequence. The access module 110 initiates the computer application corresponding to the limited-access icon in response to the selection sequence corresponding to an authorized sequence. The access module 110 compares the selection sequence with one or more stored authorized sequences and, if the selection sequence matches one of the one or more authorized sequences, performs an appropriate function. For example, if the function indicator is an indication of the computer application (e.g., an icon of the app), then the processor 30 may start the computer application that corresponds to the limited-access icon. That is, the processor 30 may initiate or launch the computer application. As another example, if the function indicator is a portion of text or other portion of a page displayed to the user by the computer application, then the processor 30 may perform a function corresponding to the function indication, e.g., displaying information indicated by the function indicator (e.g., account information) or initiating operation indicated by the function indicator (e.g., transfer money or some other action). The function performed may be within the computer application or outside of the computer application if the function indicator is a link to another application or non-application function (e.g., if the function indicator is a link to a website, then the function performed is linking to the website, e.g., launching a web browser application with the linked website as the URL). Further, if there are multiple authorized selection sequences and multiple limited-access functions corresponding to the function indicator, then the processor 30 preferably performs the function, of the multiple functions, that corresponds to the selection sequence entered by the user. Thus, for example, an app may be launched in one of various modes with different levels of access based on which of multiple authorized selection sequences the user 10 enters.

As a precursor to the process 350, the user 10 may convert a function indicator to the limited-access icon. The user 10 may select an app icon, or portion of an app page, etc. to make into a limited-access icon. For example, the user 10 may select the function indicator 128 for conversion to a limited-access icon, and the processor 30 responds by associating the code-entry segments 132 with the function indicator 128 to form the limited-access icon 126.

Further, as part of the displaying of the limited-access icon, the processor 30 may change visual indicators of the code-entry segments 132. For example, the processor may respond to receiving one or more user selections of one or more of the code-entry segments 132 by changing one or more visual indicators of one or more corresponding code-entry segments 132. Preferably, the changing of the visual indicators will not follow the same pattern between different uses of the limited-access icon (i.e., different entries of access codes using the code-entry segments 132). This may increase the security of the application as a person observing entry of a selection sequence by the user will be inhibited from repeating an authorized sequence as the physical pattern of the sequence may change from sequence to sequence (following the same sequence of visual indicators, but a different physical sequence due to different location of the visual indicators between different code entries).

Other Considerations

Techniques discussed above may be used for any secure entity (e.g., an application, a database, etc.). Techniques discussed above may be used to set an access code, e.g., when installing an application on a device, or to change the access code after initial access is granted to a secure entity.

Further, the code-entry segments may not be demarcated for the user. Thus, while the code-entry segments may exist, they may be "invisible" in that there is no visual indication of their borders, areas, locations, etc. Alternatively, the code-entry segments may be demarcated only in response to an event, e.g., touching or other selection of a limited-access icon.

Techniques discussed above may be used in a mobile-device payment system where an access code is based on payment of fees to allow access to a program or service from a provider. For instance, the provider may have accessibility to a service via a remote server and an access code is granted and sent by the provider in response to payment (or a promise for payment) being received by the provider.

Techniques discussed above may also be used as part of the educational system. For example, an application may be used to access tests, lessons, and/or grades that requires secure access, where the access may even depend upon payment. Different limited-access icons may provide different degrees of access for different applications or information.

Techniques discussed above may also be used for pre-selling literature or other media where selected data are made available but access to the full content is restricted. For example, an icon for a streaming media application may be selected to show a trailer of a movie without requiring an access code, but to access the full content of the movie, a limited-access icon is displayed, requiring entry of an acceptable access code. Further, a limited-access icon may be used in gaming, providing restricted access by a user to specific game details, options, features, levels, etc. of a game. Further still, a limited-access icon may be used in pre-paid mobile phone applications, e.g., with access codes for specific uses and/or usage time intervals.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

As used herein, including in the claims, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "processor-readable medium" and "computer-readable medium," as used herein, refer to any medium that participates in providing data that causes a machine to operate in a specific fashion. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to one or more processors for execution. Merely by way of example, the instructions may initially be carried on a magnetic disk and/or optical disc of a remote computer. A remote computer might load the instructions into its dynamic memory and send the instructions as signals over a transmission medium to be received and/or executed by a computer system.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform the described tasks.

Components, functional or otherwise, shown in the figures and/or discussed herein as being connected or communicating with each other are communicatively coupled. That is, they may be directly or indirectly connected to enable communication between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

Further, more than one invention may be disclosed.

The invention claimed is:

1. A method of providing restricted access to information of a computer application via a computing device, the method comprising:

displaying a limited-access icon on a display of the computing device, the limited-access icon including a function indicator and a plurality of passcode-entry segments, the function indicator indicating a limited-access function of the computer application and the passcode-entry segments being selectable by a user of the computing device to gain access to the limited-access function, each of the passcode-entry segments including a visual indicator, wherein the passcode-entry segments are disposed adjacent to and outside a perimeter of the function indicator, or at least one of the passcode-entry segments overlays the function indicator, or a combination thereof, and wherein the limited-access function of the computer application is distinct from access to the limited-access function providable by selection of the passcode-entry segments;

receiving a selection sequence of user selections of selected ones of the plurality of passcode-entry segments; and performing the limited-access function corresponding to the function indicator in response to the selection sequence corresponding to an authorized sequence.

2. The method of claim 1 wherein the function indicator is an indication of the computer application and wherein performing the limited-access function comprises starting the computer application.

3. The method of claim 1 wherein there are a plurality of authorized selection sequences and a plurality of limited-access functions corresponding to the function indicator, and wherein performing the limited-access function comprises performing the limited-access function of the plurality of limited-access functions that corresponds to the selection sequence.

4. The method of claim 1 wherein the function indicator is a portion of a page of the computer application and wherein performing the limited-access function comprises displaying information indicated by the function indicator or initiating an operation, within the computer application, indicated by the function indicator.

5. The method of claim 1 wherein displaying the limited-access icon comprises, in response to selecting the function indicator, associating the passcode-entry segments with the function indicator and displaying the passcode-entry segments with the function indicator as the limited-access icon.

6. The method of claim 1 wherein at least one of the visual indicators changes in response to the computing device receiving a selection of at least one of the passcode-entry segments by the user.

7. A computing device comprising:
   display means for displaying a limited-access icon, the limited-access icon including a function indicator and a plurality of passcode-entry segments, the function indicator indicating a limited-access function of a computer application and the passcode-entry segments being selectable by a user of the computing device to gain access to the limited-access function, each of the passcode-entry segments including a visual indicator, wherein the display means are for displaying the passcode-entry segments adjacent to and outside a perimeter of the function indicator, or with at least one of the passcode-entry segments overlaying the function indicator, or a combination thereof, and wherein the limited-access function of the computer application is distinct from access to the limited-access function providable by selection of the passcode-entry segments;
   selection means for receiving a selection sequence of user selections of selected ones of the plurality of passcode-entry segments; and
   access means for performing the limited-access function corresponding to the function indicator in response to the selection sequence corresponding to an authorized sequence.

8. The computing device of claim 7 wherein the function indicator is an indication of the computer application and the limited-access function comprises starting the computer application.

9. The computing device of claim 7 wherein there are a plurality of authorized selection sequences and a plurality of limited-access functions corresponding to the function indicator, and wherein the access means are for performing the limited-access function of the plurality of limited-access functions that corresponds to the selection sequence.

10. A computer program product stored on a non-transitory, processor-readable medium and comprising instructions for causing a processor to:
    cause a display to display a limited-access icon, the limited-access icon including a function indicator and a plurality of passcode-entry segments, the function indicator indicating a limited-access function of a computer application and the passcode-entry segments being selectable to gain access to the limited-access function, each of the passcode-entry segments including a visual indicator, wherein the instructions for causing the processor to cause the display to display the limited-access icon are for causing the processor to cause the display to display the passcode-entry segments adjacent to and outside a perimeter of the function indicator, or with at least one of the passcode-entry segments overlaying the function indicator, or a combination thereof, and wherein the limited-access function of the computer application is distinct from access to the limited-access function providable by selection of the passcode-entry segments;
    receive a selection sequence of selections of selected ones of the plurality of passcode-entry segments; and
    perform the limited-access function corresponding to the function indicator in response to the selection sequence corresponding to an authorized sequence.

11. The computer program product of claim 10 wherein the function indicator is an indication of the computer application and wherein the instructions configured to cause the processor to perform the limited-access function are configured to cause the processor to start the computer application.

12. The computer program product of claim 10 wherein there are a plurality of authorized selection sequences and a plurality of limited-access functions corresponding to the function indicator, and wherein the instructions configured to cause the processor to perform the limited-access function are configured to cause the processor to perform the limited-access function of the plurality of limited-access functions that corresponds to the selection sequence.

13. The computer program product of claim 10 wherein the function indicator is a portion of a page of the computer application and wherein the instructions configured to cause the processor to perform the limited-access function are configured to cause the processor to display information indicated by the function indicator or initiate an operation, within the computer application, indicated by the function indicator.

14. The computer program product of claim 10 wherein the instructions configured to cause the display to display the limited-access icon comprise instructions configured to cause the processor to, in response to receiving an indication of a selection of the function indicator, associate the passcode-entry segments with the function indicator and cause the display to display the passcode-entry segments with the function indicator as the limited-access icon.

* * * * *